Feb. 24, 1948.  J. B. PARSONS  2,436,728
VEHICLE WINDOW REGULATOR
Original Filed June 21, 1944  3 Sheets-Sheet 2
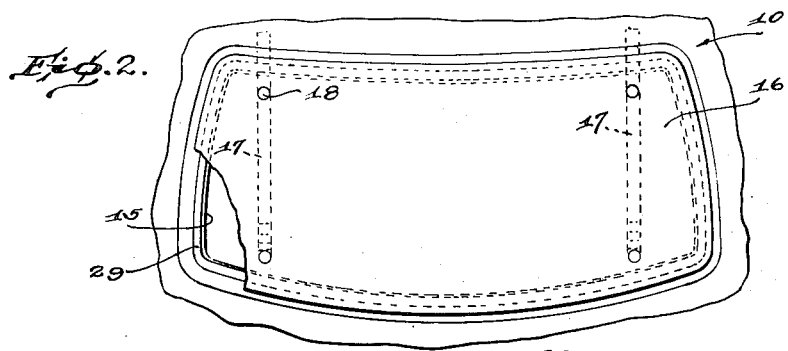
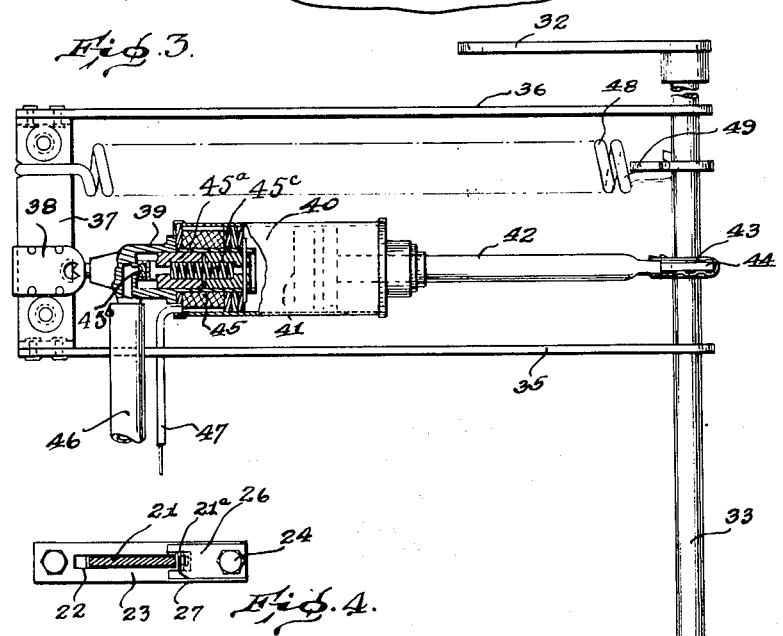
INVENTOR.
John B. Parsons
BY
ATTORNEY

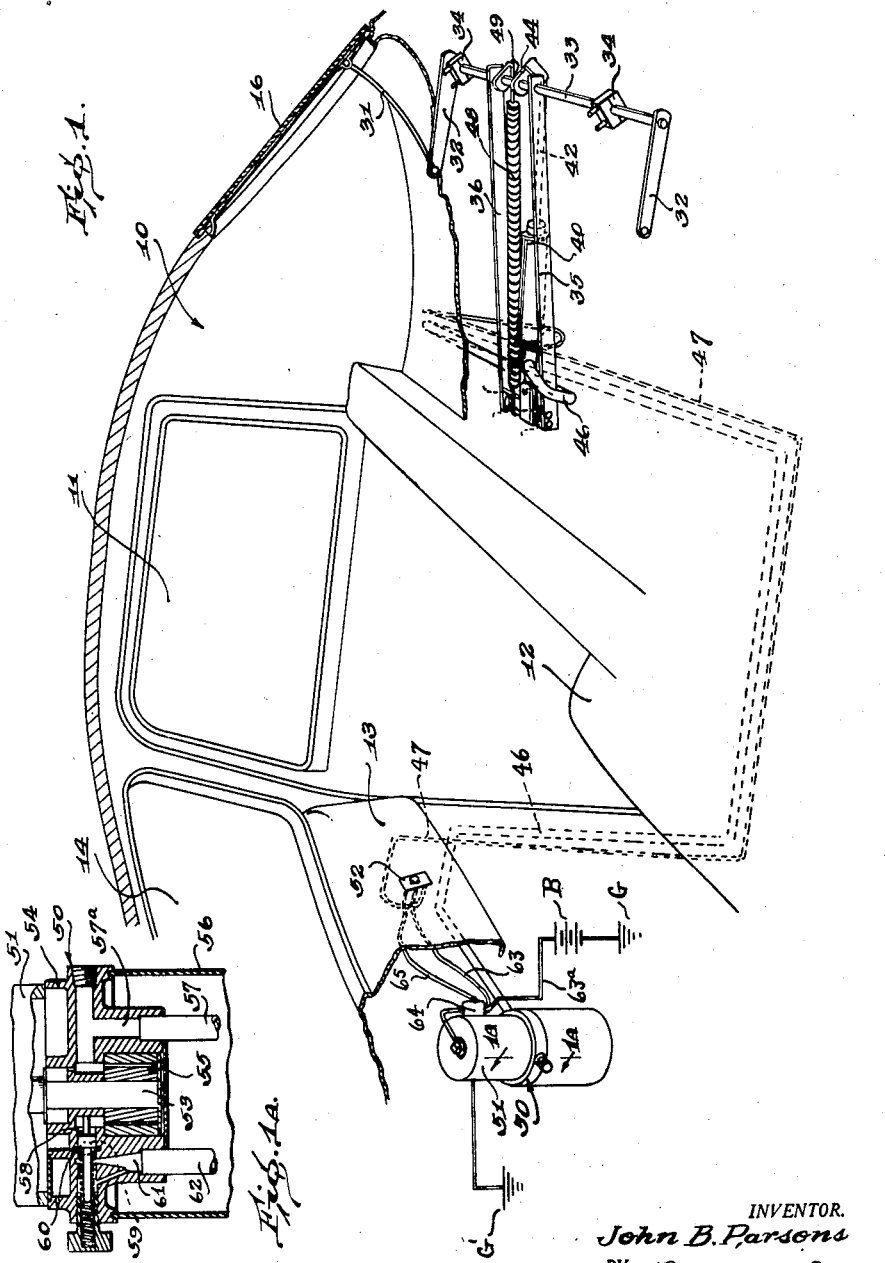

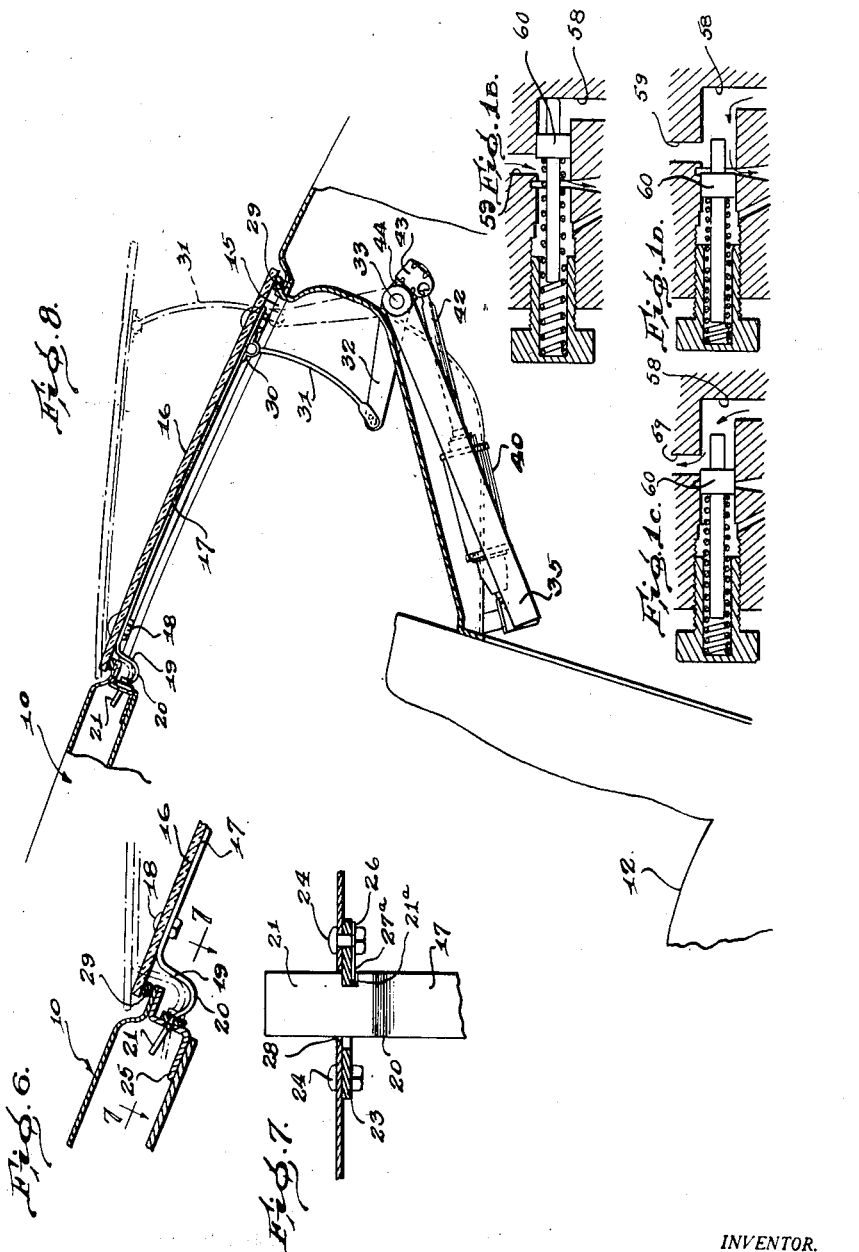

Patented Feb. 24, 1948

2,436,728

UNITED STATES PATENT OFFICE 2,436,728

VEHICLE WINDOW REGULATOR

John B. Parsons, Toledo, Ohio

Original application June 21, 1944, Serial No. 541,327. Divided and this application February 14, 1945, Serial No. 577,878

7 Claims. (Cl. 296—44)

This invention relates to regulator mechanism particularly for use on vehicles, such, for example, as automobiles to effect movement of a member between two stations or points of adjustment.

An object is to produce a regulator mechanism for a pivotally mounted vehicle window in which the window can be swung to open and closed position by mechanism arranged within the vehicle body, having the new and improved features of construction, operation and arrangement hereinafter described.

Another object is to produce a simple and efficient mounting for a vehicle window glass or panel which is inexpensive to produce and install and in which the window is adequately and efficiently sealed when in closed position but may be readily moved to and from closed position without liability of damage or injury to the operating parts.

Other objects and advantages of the invention will hereinafter appear and for purposes of illustration but not of limitation, an embodiment of the invention is shown on the accompanying drawings in which Figure 1 is a fragmentary view showing a portion of the interior of an automobile body having a hingedly mounted rear window and remotely controlled power operated mechanism for actuating the window panel;

Figure 1a is an enlarged fragmentary vertical sectional view of the mid section of the pump unit;

Figures 1b, 1c and 1d are diagrammatic sectional views showing the different positions which the valve associated with the motor driven pump may assume;

Figure 2 is an enlarged plan view taken from the outside showing the rear window panel and the mounting for the same;

Figure 3 is a top plan view of the power operated regulator mechanism for actuating the window panel, part of the cylinder being broken away to show the solenoid and spring tensioned valve;

Figure 4 is a sectional view of one of the hinge members for the window panel and the slotted mounting for the same;

Figure 5 is a fragmentary perspective view showing the mounting between one of the spring arms and the strips connected to the window panel;

Figure 6 is an enlarged sectional view showing one of the hinge mountings between the window panel and the vehicle body structure;

Figure 7 is a sectional view substantially on the line 7—7 of Figure 6; and

Figure 8 is a fragmentary vertical sectional view of the rear end portion of the vehicle body showing the mounting of the window panel, the power operated regulator mechanism and the connection between the regulator mechanism and the window panel.

The illustrated embodiment of the invention comprises an automobile body 10 having the usual side windows 11, seat 12, instrument panel 13 and windshield 14. As shown, the rear end portion of the body slopes downwardly and rearwardly and formed therein is a window opening 15, which is arranged transversely of the direction of movement of the vehicle and is adapted to be closed by a window glass or panel 16.

As will hereinafter appear, the window glass 16 is hingedly connected at its upper edge to the vehicle body so that the lower portion can swing outwardly away from the body to afford ventilation for the inside of the body, thereby providing an exceedingly simple and effective manner for exhausting foul air, smoke and gases from the inside of the automobile when in motion. The suction created in the region of the window panel 16 when in open position due to the forward movement of the vehicle, is ample most effectively to eliminate a fogging of the windows and provide an exceedingly efficient manner of ventilating the interior.

Extending transversely of the window panel 16 is a pair of relatively thin metal straps 17, which are secured in place by bolt and nut assemblies 18. As shown particularly in Figures 6 and 8, the portion of each of the straps 17 adjacent the upper edge of the window glass is bent inwardly, as indicated at 19 and is bent into a curve 20 from which the end portion 21 inclines outwardly and upwardly in a direction away from the adjacent window edge. The end portion 21 projects through a rectangular slot 22 provided in a plate 23 which is secured by bolt and nut assemblies 24 to a body member 25, substantially as shown in Figure 6. The slot 22 is shaped snugly to fit the upper and lower sides of the end portion 21. For securing the strap portion in place, a plate 26 has a notched end 27, which engages in a notch 21a formed in the adjacent side of the strap portion 21, as shown in Figure 4, the plate 26 being held in place by the adjacent bolt and nut assembly 24. An anti-rattling spring 27a is interposed between the bottoms of the notches 21a and 27 to hold the parts against vibration. It will be understood that the frame portion 25 is likewise formed with a rectangular slot 28 through which the end portion 21 of the strap extends.

In the normal closed position of the window panel 16, the edge portion thereof seats against a resilient rubber strip or gasket 29, thereby effectively sealing the window in its closed position, it being understood that the rubber strip 29 extends entirely around the edge portion of the opening 15. The above described hinge enables the window panel 16 to be swung from its full line position in Figure 8, to its broken line position, sufficient rocking movement being allowed between end portions of the straps 17 to afford this movement. Due to the slidable mounting and the resilient characteristics of the strap metal hinge extensions, it is manifest that the window glass 16 is self-aligning.

Adjacent the opposite end of each of the straps 17 is mounted a bracket 30 pivotally to receive the T-shaped end portion of a spring arm 31 which curves downwardly or in a direction away from the hinged side of the window glass 16. The opposite ends of the spring arms 31 are pivoted to arms 32 respectively which are fixed to and movable with a transverse shaft 33. Adjacent each end portion of the shaft 33 is a bearing member 34, which is suitably secured to the adjacent portion of the vehicle body 10, thereby to afford a bearing support for the shaft 33.

A pair of laterally spaced frame arms 35 and 36 loosely engage the shaft 33 at one end and are fixed to a cross bar 37 at the opposite end. The cross bar 37 is suitably attached to an adjacent vehicle body portion securely to hold same in position. Secured by a clip 38 to the cross bar 37 to have rocking movement relative thereto, is a cylindrical extension 39 to which is secured a cylinder 40 of a fluid motor. Reciprocable within the cylinder 40 is a piston 41 to which is secured a piston rod 42. The piston rod 42 is connected by a clip 43 to an arm 44 to have rocking movement relative thereto. The arm 44 is fixed for rotation to the shaft 33 and projects at substantially right angles therefrom.

Disposed within the cylinder 40 is a solenoid 45 which when energized, opens a normally closed spring tensioned ported valve 45a to admit fluid, such as liquid, under pressure through a tube 46 to actuate the piston 41 and piston rod 42 in one direction. As shown, the valve 45a is formed with a rubber sealing nose 45b which normally closes the passage communicating with the tube 46, but under the influence of the solenoid 45, the valve is unseated placing the spring 45c under tension, thereby enabling fluid to flow through the valve either to or from the cylinder. A lead 47 extends to the solenoid 45 for energizing the same.

An helical coil spring 48 has one end hooked over the cross bar 37 and the opposite end of the spring engages an arm 49 fixed for rotation to the shaft 33 and projects in the same direction as the arm 44. When it is desired to open the window glass 16, the solenoid 45 is energized to unseat the associated valve 45a so that fluid trapped in the cylinder 40 may be readily forced therefrom. The coil spring 48, which has previously been placed under tension, can thereupon rock the shaft 33 in a clockwise direction (Figure 1) and cause the arms 32 through the spring arms 31 to swing the window glass 16 outwardly, substantially to the broken line position shown in Figure 8 or to any desired intermediate position. The adjusted position of the window glass 16 is controlled by the amount of liquid which is allowed to be forced from the cylinder 40 through the tube 46. Thus by deenergizing the solenoid 45 and thereby allowing its valve 45a to seat, liquid is trapped within the cylinder 40 and further retrograde piston movement is blocked.

In order to close the window panel 16, the solenoid 45 is energized thereby to open the associated valve 45a, and, as will hereinafter be explained, liquid is forced through the tube 46 to force the piston 41 outwardly of the cylinder, thereby to cause the shaft 33 to rock in a counterclockwise direction (Figure 1) and move the window panel 16 toward or to its closed position. The spring arms 31 have sufficient resiliency to enable the liquid within the cylinder 40 to expand under changes in temperature conditions without breaking or injuring the associated parts.

The tube 46 leads from the cylinder 40 of the fluid motor to a pump unit 50, and it will be understood that this tube not only serves to conduct liquid from the unit 50 to the fluid motor, but also to conduct fluid from the fluid motor back to the unit 50. The pump unit 50 includes an electric motor 51 which is connected to a block 54. Suitably mounted on the lower end of the shaft 53 is a rotary gear pump 55. In this instance, the pump 55 consists of two rotors arranged one within the other, the same being available on the market under the name "Gerotor." However, the particular type of pump forms no part of the present invention, and detail description and illustration thereof is not considered necessary. Suffice it to say that the pump 55 draws liquid from a liquid reservoir 56 through a tube 57, which preferably terminates short of the bottom of the reservoir and thence through suitable passages 57a to the inlet side of the pump 55. The liquid is forced by the pump 55 into a lateral passage 58 in which a spring-tensioned valve 59 is slidable.

When the pump is in operation, the pressure is sufficient to move the valve 59 inwardly against the tension of the spring to uncover a port 60 with which the tube 46 is in communication, substantially as shown on Figure 1c. In this manner, liquid under pressure is delivered to the fluid motor. When the electric motor 51 is deenergized so that the pump 55 is idle, liquid from the fluid motor passes through the tube 46, port 60, which in the normal position is at least partially uncovered by the rear face of the valve 59, substantially as shown on Figure 1b. In this manner, liquid is enabled to flow into a vertical passage 61 in the block 54 and thus into a tube 62 which extends to a point close to the bottom of the reservoir 56. Thus it will be manifest that when the pump 55 is not operating, liquid may be forced from the cylinder 40 of the fluid motor through the tube 46, past the rear face of the spring tensioned valve 59 and into the reservoir through the tube 62. As shown on Figure 1d, the valve 59 may be moved farther to the left of the figure in the event of some obstruction encountered by the fluid motor, and in such event the pump 55 merely forces liquid back to the reservoir as indicated by the arrows.

The lead from the valve operating solenoid 45 extends to a normally open switch 52, which in this instance, is mounted on the instrument panel 13. From the switch 52, a lead 63 extends to a relay switch 64 associated with and electrically connected to the electric motor 51. A lead 63a extends to a battery B which is grounded at G. The motor 51 is also grounded at G'. The relay 64 is also connected to a binding post on the switch 52 by a lead 65. The arrangement is such that upon movement of the switch 52 in one direction, the valve operating solenoid 45 is energized, thereby to enable the coil spring 48 to move the window glass and at the same time force liquid from the cylinder 40. Upon movement of the switch 52 in the opposite direction, the valve operating solenoid 45 will be energized but in addition, the pump operating motor 51 through the relay 64, will be energized, thereby to operate the fluid motor, move the window glass 16 in the opposite direction, and at the same time place the spring 48 under tension. A suitable switch for the above purpose is shown in my Patent 2,344,452, granted March 14, 1944.

From the above description, it will be manifest that I have provided an exceedingly simple and efficient mechanism for swinging the window glass 16 to and from closed position and to any intermediate desired position of adjustment. The regulator mechanism can be readily installed in a vehicle body without substantial alteration of the same. One important advantage of this mechanism is that it can be conveniently controlled at a remote point, such as adjacent the driver's seat, or in whatever position it is desired.

This application constitutes a division of my copending application Serial No. 541,327, filed June 21, 1944, and entitled "Regulator mechanism."

It is to be understood that numerous changes in details of construction, arrangement and operation may be effected without departing from the spirit of the invention especially as defined in the appended claims.

What I claim is:

1. An automobile body having a window opening, a window glass for said opening arranged exteriorly of the body and overlapping the edge portion of the opening substantially throughout, a sealing gasket interposed between said window glass and the edge portion of the opening, a hinge mounting for one edge portion of the window glass including a pair of resilient strap members, each strap member extending inwardly from said window glass and thence in direction approximately paralleling the window glass, the body having apertures to receive said strap and enable rocking movements thereof, means for attaching said strap members to the inner face of the window glass, said strap members extending across the window glass, arm means for imparting movement to the window glass, and means connecting said arm means to the opposite end portions of said strap members.

2. An automobile body having an elongate window opening, a window glass in overlapping relation to said opening and disposed on the outside of the body, a sealing strip extending entirely around said opening providing a seal between the edge of said opening and said window glass, a pivotal mounting for the upper edge portion of said window glass, means engaging the opposite edge portion of said window glass for imparting swinging movements thereto, said means comprising a rotatable elongate shaft disposed parallel to the axis of pivotal movement of the window glass, arms fixed to said shaft, yieldable connections between said arms and said window glass, and remotely controlled power means for imparting rocking movements to said shaft.

3. An automobile body having a window opening, a window glass in overlapping relation to said opening and disposed on the outside of the body, a sealing strip extending entirely around said opening providing a seal between the edge of said opening and said window glass, a pivotal mounting for one edge portion of said window glass, means engaging an opposite edge portion of said window glass for imparting outward swinging movements thereto, said means comprising a rotatable shaft disposed parallel to the axis of pivotal movement of the window glass, spaced arms fixed to said shaft, links pivoted to the outer end of each arm and to the opposite edge portion of said window glass, said link being resiliently yieldable, and means for imparting rocking movements in one direction or the other to said shaft for opening and closing said window glass.

4. An automobile body having a window opening, a window glass for said opening arranged exteriorly of the body and overlapping the edge portion of the opening substantially throughout, mounting means associated with a near edge portion of the window glass enabling same to be rocked outwardly of the opening, said means comprising spaced resilient strap members attached at one portion of the window glass, slots in the automobile body adapted to receive the free end portions of said straps, abutment means for preventing shifting movements of said straps in relation to said slots, tensioning means in said slots interposed between said straps and said automobile body, and means engaging said window glass for imparting swinging movement thereto.

5. An automobile body of the closed type having a sloping rear wall extending downwardly from the top, a window opening in said rear wall disposed transversely thereof, a window panel for said opening, a hinge mounting for said panel at the upper edge portion thereof enabling the panel to swing outwardly away from the opening, and power means connected to a free portion of said window panel for imparting opening and closing movements thereto, said power means including regulator means arranged in close juxtaposed relation to the lower portion of the window panel and substantially concealed in the body in a plane beneath the window opening and control means for said regulator means operatively connected thereto and disposed remotely therefrom, whereby when the automobile is moving forwardly the stream of air passing over the sloping rear wall creates a low pressure area in the region of the open window panel for withdrawing foul air and gases from the inside of the body.

6. An automobile body having an elongate window opening, a window glass in overlapping relation to said opening and disposed on the outside of the body, a sealing gasket disposed around said opening and adapted to abut the edge portions of the window glass when in the closed relation, a pivotal mounting for one edge of the window glass, means engaging the opposite edge of the window glass for imparting swinging movement thereto, said means comprising an elongate rotatable shaft disposed parallel to the pivotal movement of the window glass, lever arms fixed to said shaft, resilient link means interconnecting said lever arms with the opposite edge portion of the window glass, crank arms connected to said elongate shaft, and power means for rocking said crank arms in one direction or the other, said power means including a linear motor connected to one crank arm for imparting movement in one direction to said elongate shaft, and spring means connected to another crank arm for imparting movement to said elongate shaft in the opposite direction.

7. An automobile body having a sloping rear wall extending downwardly from the top, an opening in said rear wall, a panel adapted to cover said opening, a hinge mounting for said panel at the upper portion thereof enabling the free portion of the panel to swing outwardly away from the opening, and power means connected to a free portion of said panel for imparting swinging movement thereto, said power means including regulator mechanism arranged in close juxtaposed relation to the lower portion of the panel and substantially concealed in the body in a plane beneath said rear wall opening, and control means for said regulator mechanism operatively connected thereto and disposed remotely therefrom, whereby when the automobile is moving forwardly the stream of air passing over the sloping rear wall creates a low pressure area in the region of the open panel for withdrawing foul air and gases from the inside of the body.

JOHN B. PARSONS.

REFERENCES CITED

The following references are of record in the file of this patent:

UNITED STATES PATENTS

| Number | Name | Date |
|---|---|---|
| 1,491,222 | Arnold | Apr. 22, 1924 |
| 1,582,240 | Bennett | Apr. 27, 1926 |
| 1,715,402 | Woodward | June 4, 1929 |
| 1,799,516 | Johnson et al. | Apr. 7, 1931 |
| 1,934,635 | Davoran | Nov. 7, 1933 |
| 1,963,941 | Duffy | June 19, 1934 |
| 2,058,328 | Ledwinka | Oct. 20, 1936 |
| 2,093,201 | Love | Sept. 14, 1937 |
| 2,140,865 | Tuttle | Dec. 20, 1938 |
| 2,143,889 | Ledwinka | Jan. 17, 1939 |
| 2,326,357 | Horton | Aug. 10, 1943 |
| 2,372,164 | Woodhams | Mar. 20, 1945 |